United States Patent
Renkis (10) Patent No.: US 8,842,179 B2
(45) Date of Patent: Sep. 23, 2014

(54) VIDEO SURVEILLANCE SHARING SYSTEM AND METHOD

(75) Inventor: Martin A. Renkis, Nashville, TN (US)

(73) Assignee: Smartvue Corporation, Nashville, TN (US)

( * ) Notice: Subject to any disclaimer, the term of this patent is extended or adjusted under 35 U.S.C. 154(b) by 535 days.

(21) Appl. No.: 13/250,546

(22) Filed: Sep. 30, 2011

(65) Prior Publication Data

US 2012/0105632 A1    May 3, 2012

Related U.S. Application Data

(63) Continuation-in-part of application No. 10/949,489, filed on Sep. 24, 2004, now Pat. No. 8,208,019, and a continuation-in-part of application No. 10/955,552, filed on Sep. 30, 2004, and a continuation-in-part of application No. 10/955,825, filed on Sep. 30, 2004, and a continuation-in-part of application No. 10/955,824, filed on Sep. 30, 2004, and a continuation-in-part of application No. 10/977,762, filed on Oct. 29, 2004, and a continuation-in-part of application No. 11/202,996, filed on Aug. 12, 2005, and a continuation-in-part of application No. 11/247,421, filed on Oct. 11, 2005, and a continuation-in-part of application No. 11/413,692, filed on Apr. 29, 2006, and a continuation-in-part of application No. 11/480,079, filed on Jun. 30, 2006, and a continuation-in-part of application No. 11/520,505, filed on Sep. 12, 2006, and a continuation-in-part of application No. 11/520,117, filed on Sep. 13, 2006, and a continuation-in-part of application No. 12/380,807, filed on Mar. 4, 2009, and a continuation-in-part of application No. 12/759,768, filed on Apr. 14, 2010, and a continuation-in-part of application No. 12/874,599, filed on Sep. 2, 2010.

(51) Int. Cl.
*H04N 9/47* (2006.01)
*H04N 7/18* (2006.01)
*G08B 13/196* (2006.01)

(52) U.S. Cl.
CPC .............. *H04N 7/183* (2013.01); *H04N 7/181* (2013.01); *G08B 13/19619* (2013.01); *G08B 13/19621* (2013.01); *G08B 13/19656* (2013.01); *G08B 13/1966* (2013.01); *G08B 13/19663* (2013.01); *G08B 13/19673* (2013.01); *G08B 13/1968* (2013.01); *G08B 13/19682* (2013.01); *H04N 7/18* (2013.01); *H04N 7/185* (2013.01)
USPC ....................................................... 348/143

(58) Field of Classification Search
CPC ............................. H04N 7/181; H04N 7/183
USPC ....................................................... 348/143
See application file for complete search history.

(56) References Cited

U.S. PATENT DOCUMENTS

| | | |
|---|---|---|
| 4,699,484 A | 10/1987 | Howell et al. |
| 4,771,305 A | 9/1988 | Potoraka |

(Continued)

OTHER PUBLICATIONS

Matsuyama, T. and Ukita, N. Real-Time Multitarget Tracking by a Cooperative Distributed Vision System. Proceedings of the IEEE, vol. 90, No. 7, Jul. 2002. pp. 1136-1150.

(Continued)

*Primary Examiner* — Chikaodili E Anyikire
(74) *Attorney, Agent, or Firm* — Triangle Patents, PLLC (57) ABSTRACT

A surveillance system and method with at least one wireless input capture device ICD(s) and a corresponding digital input recorder (DIR) and/or another ICD, including the steps of providing base system; at least one user accessing the DIR via user interface either directly or remotely; the DIR and/or ICD searching for signal from the ICD(s) and establishing communication with them; providing DIR interface and setup options, for providing a secure surveillance system having wireless communication for monitoring a target environment.

19 Claims, 6 Drawing Sheets

(56) References Cited

U.S. PATENT DOCUMENTS

| | | |
|---|---|---|
| 5,086,385 A | 2/1992 | Launey et al. |
| 5,257,007 A | 10/1993 | Steil et al. |
| 5,485,964 A | 1/1996 | Booth et al. |
| 5,584,576 A | 12/1996 | Wei Hong |
| 5,586,171 A | 12/1996 | McAllister et al. |
| 5,598,351 A | 1/1997 | Chater et al. |
| 5,653,412 A | 8/1997 | Martorano et al. |
| 5,673,022 A | 9/1997 | Patel |
| 5,697,099 A | 12/1997 | Siska et al. |
| 5,898,831 A | 4/1999 | Hall et al. |
| 6,052,574 A | 4/2000 | Smith, Jr. |
| 6,122,678 A | 9/2000 | Eckel et al. |
| 6,211,907 B1 | 4/2001 | Scaman et al. |
| 6,226,035 B1 | 5/2001 | Korein et al. |
| 6,249,223 B1 | 6/2001 | Christensen |
| 6,300,976 B1 | 10/2001 | Fukuoka |
| 6,310,571 B1 | 10/2001 | Yang et al. |
| 6,335,742 B1 | 1/2002 | Takemoto |
| 6,380,880 B1 | 4/2002 | Biddermann |
| 6,452,152 B1 | 9/2002 | Yang |
| 6,498,336 B1 | 12/2002 | Tian et al. |
| 6,498,576 B1 | 12/2002 | Tian et al. |
| 6,498,620 B2 * | 12/2002 | Schofield et al. ............. 348/148 |
| 6,507,083 B1 | 1/2003 | Tian |
| 6,518,909 B1 | 2/2003 | Yang et al. |
| 6,542,189 B1 | 4/2003 | Tian |
| 6,545,228 B2 | 4/2003 | Hashimoto |
| 6,545,258 B2 | 4/2003 | Tian et al. |
| 6,548,967 B1 | 4/2003 | Dowling et al. |
| 6,552,352 B2 | 4/2003 | Momose et al. |
| 6,552,746 B1 | 4/2003 | Yang et al. |
| 6,559,769 B2 | 5/2003 | Anthony et al. |
| 6,591,474 B2 | 7/2003 | Soloway et al. |
| 6,665,012 B1 | 12/2003 | Yang |
| 6,680,748 B1 | 1/2004 | Monti |
| 6,693,575 B1 | 2/2004 | Yang |
| 6,697,103 B1 | 2/2004 | Fernandez et al. |
| 6,697,104 B1 | 2/2004 | Yakobi et al. |
| 6,698,021 B1 | 2/2004 | Amini et al. |
| 6,703,939 B2 | 3/2004 | Lehrman et al. |
| 6,720,990 B1 | 4/2004 | Walker et al. |
| 6,726,103 B1 | 4/2004 | Motta et al. |
| 6,737,626 B1 | 5/2004 | Bidderman |
| 6,759,952 B2 | 7/2004 | Dunbridge |
| 6,759,956 B2 | 7/2004 | Menard et al. |
| 6,763,231 B2 | 7/2004 | Takatori et al. |
| 6,765,619 B1 | 7/2004 | Deng et al. |
| 6,778,237 B2 | 8/2004 | Arakawa et al. |
| 6,788,237 B1 | 9/2004 | Bidermann et al. |
| 6,791,611 B2 | 9/2004 | Yang |
| 6,816,184 B1 | 11/2004 | Brill et al. |
| 6,830,387 B2 | 12/2004 | Rife |
| 6,831,699 B2 | 12/2004 | Chang et al. |
| 6,970,183 B1 | 11/2005 | Monroe |
| 7,015,945 B1 | 3/2006 | Sullivan |
| 7,019,644 B2 | 3/2006 | Barrie |
| 7,020,701 B1 | 3/2006 | Gelvin et al. |
| 7,023,913 B1 * | 4/2006 | Monroe .................. 375/240.01 |
| 7,092,369 B2 | 8/2006 | Fuccello et al. |
| 7,130,383 B2 | 10/2006 | Naidoo et al. |
| 7,138,902 B2 | 11/2006 | Menard |
| 7,148,803 B2 | 12/2006 | Bandy et al. |
| 7,202,889 B2 | 4/2007 | Suzuki et al. |
| 7,239,236 B1 | 7/2007 | Britton et al. |
| 7,298,400 B2 | 11/2007 | Taguchi |
| 7,304,662 B2 | 12/2007 | Sullivan et al. |
| 7,336,669 B1 | 2/2008 | Mammen et al. |
| 7,403,220 B2 | 7/2008 | MacIntosh et al. |
| 7,450,638 B2 | 11/2008 | Iwamura |
| 7,603,087 B1 | 10/2009 | Renkis |
| 7,719,567 B2 | 5/2010 | Renkis |
| 7,886,010 B1 | 2/2011 | Shankar |
| 7,899,887 B2 | 3/2011 | Conn |
| 7,920,528 B2 | 4/2011 | Karaoguz |
| 2001/0033332 A1 | 10/2001 | Kato et al. |
| 2001/0040805 A1 | 11/2001 | Lansing et al. |
| 2002/0010052 A1 | 1/2002 | Suzuki |
| 2002/0019985 A1 | 2/2002 | Fuccello et al. |
| 2002/0024812 A1 | 2/2002 | Agro |
| 2002/0026636 A1 | 2/2002 | LeComte |
| 2002/0109863 A1 | 8/2002 | Monroe |
| 2002/0154791 A1 | 10/2002 | Onuma et al. |
| 2002/0186180 A1 | 12/2002 | Duda |
| 2002/0188955 A1 | 12/2002 | Thompson et al. |
| 2003/0007663 A1 | 1/2003 | Wixson et al. |
| 2003/0023614 A1 | 1/2003 | Newstrom |
| 2003/0034387 A1 | 2/2003 | Knowles et al. |
| 2003/0037341 A1 | 2/2003 | Van Der Meulen |
| 2003/0053091 A1 | 3/2003 | Tanaka et al. |
| 2003/0081121 A1 * | 5/2003 | Kirmuss ..................... 348/143 |
| 2003/0112335 A1 | 6/2003 | Strandwitz |
| 2003/0120745 A1 | 6/2003 | Katagishi et al. |
| 2003/0137426 A1 | 7/2003 | Anthony et al. |
| 2003/0184647 A1 * | 10/2003 | Yonezawa et al. ............ 348/143 |
| 2003/0188320 A1 | 10/2003 | Shing |
| 2003/0189638 A1 | 10/2003 | Fry |
| 2003/0193395 A1 | 10/2003 | Ahiska et al. |
| 2004/0001214 A1 | 1/2004 | Monroe |
| 2004/0002792 A1 | 1/2004 | Hoffknecht |
| 2004/0008255 A1 * | 1/2004 | Lewellen ..................... 348/148 |
| 2004/0021778 A1 | 2/2004 | Oldani et al. |
| 2004/0046027 A1 | 3/2004 | Leone et al. |
| 2004/0093409 A1 | 5/2004 | Thompson et al. |
| 2004/0105006 A1 | 6/2004 | Lazo et al. |
| 2004/0113778 A1 | 6/2004 | Script |
| 2004/0122633 A1 | 6/2004 | Bang et al. |
| 2004/0133786 A1 | 7/2004 | Tarbouriech |
| 2004/0136388 A1 | 7/2004 | Schaff |
| 2004/0165546 A1 | 8/2004 | Roskind |
| 2004/0168194 A1 | 8/2004 | Hughes |
| 2005/0012829 A1 | 1/2005 | Tashiro et al. |
| 2005/0100329 A1 | 5/2005 | Lao et al. |
| 2005/0111701 A1 * | 5/2005 | Seki et al. ..................... 382/107 |
| 2005/0149879 A1 | 7/2005 | Creamer et al. |
| 2005/0201297 A1 | 9/2005 | Peikari |
| 2005/0204026 A1 | 9/2005 | Hoerl |
| 2006/0066721 A1 | 3/2006 | Renkis |
| 2006/0066729 A1 | 3/2006 | Renkis |
| 2006/0070107 A1 | 3/2006 | Renkis |
| 2006/0070108 A1 | 3/2006 | Renkis |
| 2006/0070109 A1 | 3/2006 | Renkis |
| 2006/0072013 A1 | 4/2006 | Renkis |
| 2006/0075235 A1 | 4/2006 | Renkis |
| 2006/0176834 A1 | 8/2006 | Dickerson et al. |
| 2006/0219776 A1 * | 10/2006 | Finn .............................. 235/380 |
| 2006/0279628 A1 | 12/2006 | Fleming |
| 2007/0005795 A1 * | 1/2007 | Gonzalez ..................... 709/232 |
| 2007/0075857 A1 | 4/2007 | Chang |
| 2007/0236343 A1 | 10/2007 | Becksted et al. |
| 2007/0286144 A1 | 12/2007 | Miyake |
| 2009/0031966 A1 | 2/2009 | Kates |
| 2011/0169634 A1 | 7/2011 | Raj |

OTHER PUBLICATIONS

Langer. Mac OS X 10.2 Advanced: Visual QuickPro Guide, 2002. pp. 1-17.

How a Cell Phone Works, http://web.archive.org/web/19981206094029/http://howstuffworks.com/cell-phone.htm, 1998.

Fleck, B, 802.11 Security, O'Reilly Publishing, Dec. 2002, Section 1.5 and 1.5.1.

* cited by examiner

VIDEO SURVEILLANCE SHARING SYSTEM AND METHOD

CROSS-REFERENCE TO RELATED APPLICATIONS

This non-provisional utility patent application is related to one or more prior filed co-pending non-provisional applications as a continuation-in-part:

U.S. application Ser. No. 10/949,489 entitled "Wireless Video Surveillance System and Method with External Removable Recording," filed on. Sep. 24, 2004 now U.S Pat. No. 8,208,019.

U.S. application Ser. No. 10/955,552 entitled "Wireless Video Surveillance System & Method with Digital Input Recorder Interface and Setup," filed on Sep. 30, 2004.

U.S. application Ser. No. 10/955,825 entitled "Wireless Video Surveillance System & Method with Rapid Installation," filed on Sep. 30, 2004.

U.S. application Ser. No. 10/955,824 entitled "Wireless Video Surveillance System and Method with Security Key," filed on Sep. 30, 2004.

U.S. application Ser. No. 10/977,762 entitled "Wireless Video Surveillance System and Method for Mesh Networking," filed on Oct. 29, 2004.

U.S. application Ser. No. 11/202,996 entitled "Wireless Video Surveillance System and Method for Mesh Networking," filed on Aug. 12, 2005

U.S. application Ser. No. 11/247,421 entitled "Wireless Video Surveillance System and Method for Mesh Networking," filed on Oct. 11, 2005

U.S. application Ser. No. 11/413,692 entitled "Wireless Video Surveillance System and Method for Mesh Networking," filed on Apr. 29, 2006

U.S. application Ser. No. 11/480,079 entitled "Wireless Video Surveillance System and Method for Mesh Networking," filed on Jun. 30, 2006

U.S. application Ser. No. 11/520,505 entitled "Wireless Video Surveillance System and Method for Mesh Networking," filed on Sep. 12, 2006

U.S. application Ser. No. 11/520,117 entitled "Wireless Video Surveillance System and Method for Mesh Networking," filed on Sep. 13, 2006

U.S. application Ser. No. 12/380,807 entitled "Wireless Video Surveillance System and Method for Mesh Networking," filed on Mar. 4, 2009

U.S. application Ser. No. 12/759,768 entitled "Wireless Video Surveillance System and Method for Mesh Networking," filed on Apr. 14, 2010

U.S. application Ser. No. 12/874,599 entitled "Wireless Video Surveillance System and Method for Mesh Networking," filed on Sep. 2, 2010

BACKGROUND OF THE INVENTION (1) Field of the Invention

The present invention relates generally to surveillance technology and equipment and, more particularly, to a wireless video surveillance system and methods associated therewith.

(2) Background of the Invention

While video surveillance systems have existed in the prior art, typically they are wired devices that are difficult, time-consuming, and costly to install and operate. Also, generally, they do not provide for wireless systems that are secure from wireless interception or Internet enabled interception and permit remote user access for viewing, reviewing stored information, and controlling the system's components, in particular via Internet connection to a remote controller computer or cellular phone or other Internet connected device. Thus, there remains a need in the art for a wireless surveillance system and methods of operating same, providing simple setup and controls for high quality input capture by surveillance input capture devices (ICD), including but not limited to video inputs, and digital input recorder device(s) (DIR) associated with the ICDs, the DIRs data transfer, storage, and control, including systems and methods providing for remote viewing and controls of the ICDs and DIRs via a remote server computer (RSC) and/or Internet access through the RSC.

Examples of prior art may include:

U.S. Patent Application Pub. No. 20040136388 published Jul. 15, 2004, for Schaff, for Video-monitor/recording/playback system, describes a stand-alone video recording, playback and Monitoring system. It has network switches, non-volatile storage devices, IP cameras, video servers, and NTSC cameras. The system uses communication channels that are WAN/LAN based and can be hard-wired or wireless.

U.S. Patent Application Pub. No. 20020186180 published Dec. 12, 2002, for Duda, William, for Hands free solar powered cap/visor integrated wireless multi-media apparatus, describes an apparatus whereby the functional electronics components of popular consumer communications and entertainment products can be repackaged in a molded plastic module that would be mounted underneath and follow the contour of the visor of a head wearable cap/visor providing the user with a hands free, continuous power, virtually invisible multi-media capability. The module would feature, a drop down visual display, drop down camera lens for low resolution digital photography, rechargeable battery, stereo speakers and earphones, a microphone and microphone boom, manual push button controls and LED indicator lights, input/output jacks, and an interactive voice capability. A flexible solar cell and antenna would be mounted on the upper surface of the head wearable cap/visor providing the wireless link and continuous power to the electronics module. All components would be secured to the head wearable cap visor via two active pins that protrude from the upper surface of the electronic module, pierce the visor, and mate up with the solar cell and antenna on the upper surface of the visor.

U.S. Patent Application Pub. No. 20020026636 published Feb. 28, 2002, for LeComte, for Video interfacing and distribution system and method for delivering video programs, describes a video interfacing arrangement for connecting at least one display device to at least one video source composed of a module including a dedicated and programmed digital processing unit adapted to decode and descramble video flow according to a preloaded decoding or descrambling program, in order to display, in real time or delayed in time, to store, to record and/or to send over a telecommunication network, and on at least one screen interface, at least one storage or recording interface, a local or wide area network connecting interface and a user communication and controlling interface, the interfaces being linked to and driven by the processing unit and preferably mounted in or on the module. The invention also concerns a distribution system and a method for transferring encoded video programs and sequences over a wide area network.

U.S. Pat. No. 6,335,742 issued Jan. 1, 2002, to Takemoto, for Apparatus for file management and manipulation using graphical displays and textual descriptions, describes a processor-based display processing apparatus, method and user interface allows for easy understanding of the contents of respective files by present a portion of the respective files as a graphics image along with other associated attributes of the respective files. A computer readable recording medium with a program recorded therein is provided for enabling a computer to function as the apparatus and perform the method. In the display processing apparatus, when an operator selects a folder from a folder display area on a browser screen, a processor controls the selected folder to be identified and displayed, and graphics images of image files contained in the selected folder are displayed in a predetermined display area.

U.S. Patent Application Pub. No. 20040008255 published Jan. 15, 2004, for Lewellen, for Vehicle video system and method, describes a vehicle video system includes a small camera in the passenger area that uses illumination in the non-visible spectrum to illuminate the passenger area. The vehicle video system records video information on a digital video recorder that uses digital media such as a hard disk drive, recordable CD (CD-R), rewritable CD (CR-RW), or writable Digital Video Disc (DVD). The vehicle video system includes a local wireless interface, such as a Bluetooth-compatible interface, that automatically connects to a compatible device in the parking area of the vehicle that is coupled to a database. In this manner, the digital video information collected by the vehicle video system is automatically transferred to the database when the vehicle is parked, removing the need for any human intervention for the logging and cataloging of video tapes. The local wireless interface of the vehicle video system also allows other devices, such as a handheld device or a vehicle video system in a different vehicle, to access the stored digital video information.

U.S. Patent Application Pub. No. 20040165546 published Aug. 26, 2004, for Roskind, for Time based wireless access provisioning, describes a method and apparatus for the time-based provisioning of wireless devices. A network access point monitors operation of wireless devices within a service region. When provisioning logic is activated at the network access point, the access point determines if the tracked parameter (such as power on or the onset of signal transmission) of the wireless device occurs within a designated time interval from the time of the provisioning activation. If the tracked device qualifies, the network access point proceeds with provisioning the device. In one system embodiment, the network access point tracks the power on time of wireless devices. When a wireless device to be authorized is powered on, the provisioning logic at the network access point notes the power on time. The user then activates the provisioning access at the network access point, and the network access point provisions the wireless device if it is recently powered on.

U.S. Patent Application Pub. No. 20030188320 published Oct. 2, 2003, for Shing, for Method and system for a distributed digital video recorder, describes a system and method, for remote display and control of an audio/video data stream from a capture device, e.g., a TV capture card, audio/visual capture card or digital camera capture card in a PC. In an exemplary embodiment there are some components of a software DVR player executing on at least one client device and other components on at least one server device. Users can view and/or control the audio/video data from a server device, having a capture device, on client devices located anywhere as long as they are connected to the server through a network. In addition, a server device with a capture device can support display of the video data at multiple client devices at the same time.

U.S. Patent Application Pub. No. 20020188955 published Dec. 12, 2002, for Thompson et al., for Digital video recording and playback system for television, describes a system and apparatus for digitally recording and playing back videos from either an Internet website or a TV broadcast or cablecast is disclosed herein. The system comprises a set-top box, along with the necessary cables and remote control units, that connects between a television set and an Internet hook-up and allows a viewer to digitally record TV shows and/or download video from the Internet and store said video on the set-top box's hard drive for later viewing (using video encoding technology). In addition to the recording and playback capabilities, the disclosed system allows the viewer to pause, rewind, slow motion, and instant replay live television without videotapes or VCR programming.

U.S. Patent Application Pub. No. 20040168194 published Aug. 26, 2004, for Hughes, for Internet tactical alarm communication system, describes an Internet tactical alarm communication (ITAC) system includes at least one sensor, at least one video camera, and an ITAC computer delivery unit, wherein the at least one sensor, the at least one video camera, and the ITAC computer delivery unit are communicatively interconnected, and the ITAC system provides real-time data regarding a particular condition.

U.S. Patent Application Pub. No. 20020100052 published Jul. 25, 2002, for Daniels, for Methods for enabling near video-on-demand and video-on-request services using digital video recorders, describes a near video-on-demand (VOD) service enabled using a digital video recorder (DVR) for the simultaneous storage and playback of multimedia data. A DVR is connected over a network to a multimedia network source. A VOD selection is requested by the DVR from the network source. A multimedia data signal is received by the DVR from the network source. The data signal contains the requested VOD selection. A first received portion of the received data signal is stored on the DVR. The first received segment is played by the DVR for display on a display device. Simultaneously during the playing of the first received segment, a second received segment of the received data signal is received from the network source and stored on the DVR while the first received segment is played the display device. Thus, the requested VOD selection begins playing on the display device prior to the reception of the entire compressed multimedia data signal so that a requested VOD selection can begin being displayed nearly instantaneously after the request for it is made. A video-on-request (VOR) service is also enabled using a DVR. VOR selection data is received by a centralized database device, such as a network server, from a plurality of users. Each VOR selection data includes at least one requested video selection and video recorder identifying information for identifying each particular video recorder. A transmission priority of requested video selections is determined dependent on the frequency of requests .sup.1received from the plurality of users. A transmission channel and time is determined based on the transmission priority. DVR control signals are transmitted to automatically tune in the determined transmission channel at the determined transmission time and record the particular video selection.

Many large establishments and chains of establishments use the video recorded by their surveillance system to investigate and manage issues such as slip and fall, theft, and other important events. When a significant event occurs, the video clip is downloaded from the DVR that recorded it and several copies of the video are sent/emailed/updated to several people. Multiple significant events occur daily in large establishments, resulting in multiple video transmissions that are taxing their network with no way to manage the data overload and no central way to manage who sees the videos or who shares videos.

U.S. Pat. No. 6,141,007 issued Oct. 31, 2000 to Lebling; P. et al. for Newsroom user interface including multiple panel workspaces teaches a newsroom computer graphical user interface and method for displaying a workspace including non-overlapping, cooperating panels. A first of the panels displays a queue of news stories from a selected data file. A second panel displays the text of a news story selected from the queue. The workspace is displayed in a main application window on a display screen of a computer system that is coupled to a network. The first and second panels may share a common moveable border. A third panel may also be displayed that includes a directory tree of data files from which the selected data file is selected. The second panel may include sub-panels such as one that displays the text of the selected news story; a second that displays information about the news story; and a third that displays machine code for manipulating machines, such as a video playback device, during a broadcast. The machine code may be anchored to a predetermined point in the text displayed in the first sub-panel. The predetermined point is a location in the text at which the machines are controlled in response to the machine code.

U.S. Pat. No. 7,080,124 issued Jul. 18, 2006 to Shankar; Krishnan V. for Digital media resource messaging teaches a digital media resource messaging system provides a convenient digital media resource viewing, managing, organizing, and editing platform that facilitates enhanced resource exchange by storing and forwarding digital media resources via a server between multiple resource-sharing partners designated by the user. In one embodiment, the digital media resource messaging system includes services to view, manage, organize, edit, and exchange digital images and video sequences.

U.S. Pat. No. 7,213,051 issued May 1, 2007 to Zhu; Min et al. for On-line conference recording system teaches a system and method that allow for recording an on-line meeting (also referred to as an "on-line conference") and saving the recording as a meeting recording file. Additionally, the saved meeting recording file may be played back and/or edited. Moreover, a user may open a meeting recording file during an on-line meeting, and all attendees of the on-line meting can see, as well as hear, the recording content.

U.S. Pat. No. 7,287,053 issued Oct. 23, 2007 to Bodin; William Kress for Ad hoc data sharing in virtual team rooms teaches a method of ad hoc data sharing for virtual teams rooms, including creating at least one user record representing a user granted access to digital assets, wherein each user has a client device, at least two of the client devices are wirelessly coupled for data communications to at least one computer, and each user record comprises a user access privilege field identifying for each user that user's user access privilege for access to digital assets. Embodiments also include receiving from client devices digital asset records representing digital assets, retrieving digital assets in dependence upon the location fields in the digital asset records, displaying the retrieved digital assets, and editing one or more of the retrieved digital assets, wherein the editing is carried out in dependence upon user access privilege and in dependence upon asset access permission.

U.S. Pat. No. 7,426,743 issued Sep. 16, 2008 to Lee; Kuo Chu et al. for Secure and private ISCSI camera network teaches a peer-to-peer camera sensor network is defined using intelligent cameras that employ iSCSI initiators and iSCSI targets to read and write data and to send control commands directly across the network as iSCSI blocks. Because data transfer rides on top of the internet protocol, cameras can be directly attached to the internet without requiring attachment to a host computer. Image data represented as video frames are mapped onto iSCSI data blocks and are shared among the cameras directly to form an efficient virtual block level video image frame storage that can be directly manipulated by multiple cameras without data replications. Transport of multiple streams, associated with scalable or multilevel MPEG encoding scheme for instance, are automatically sequenced and realigned as the iSCSI data blocks are time-aligned.

U.S. Pat. No. 7,886,010 issued Feb. 8, 2011 to Shankar; Krishnan V. for Digital media resource messaging teaches a digital media resource messaging system provides a convenient digital media resource viewing, managing, organizing, and editing platform that facilitates enhanced resource exchange by storing and forwarding digital media resources via a server between multiple resource-sharing partners designated by the user. In one embodiment, the digital media resource messaging system includes services to view, manage, organize, edit, and exchange digital images and video sequences.

U.S. Pat. No. 7,899,887 issued Mar. 1, 2011 to Conn; Eric for Real time collaborative on-line multimedia albums teaches methods and systems for creating, editing and monitoring real-time collaborative on-line multimedia albums at a host site. The invention facilitates the construction of the multimedia albums which comprise digital content, such as photos and video clips, provided by multiple digital content contributors, taken from each contributor's unique perspective. The invention uniquely creates these multimedia albums to be optimized for dynamic updating, real-time interaction, and rapid dissemination to a viewing audience, for public and/or private viewing, either one photo/video clip at a time or as a slide-show.

U.S. Pat. No. 7,920,528 issued Apr. 5, 2011 to Karaoguz; Jeyhan et al. for View sharing between in-range devices teaches a system and method for sharing a view between systems in a dynamic wireless communication network. Various aspects of the present invention may comprise a first system communicating information of a view to a display resource of the first system. The first system may establish a two-way wireless communication link between the first system and a second system in the dynamic wireless communication network. The second system may, for example, communicate a request to the first system for the first system to share a view with the second system. The first system may, for example, receive such a request and respond to such a request by communicating information of a view to the second system. The second system may then communicate information of the view to a display resource of the second system. Various aspects may comprise the first and second systems communicating view modification information between the systems.

US Patent Application 20070075857 issued Apr. 5, 2007 to Chang; Cheng-Jyh; et al. for Video surveillance system teaches a video surveillance system is used with a plurality of video sources and a monitor. The system includes a video surveillance control device in communication with the video sources and the monitor; and a video surveillance control program operated in the video surveillance control device for controlling the video surveillance control device to output a display signal to the monitor, thereby showing a user interface on the monitor. A user interface editor is provided in the video surveillance control device for allowing a user to edit the user interface according to his or her demand.

US Patent Application 20110169634 issued Jul. 14, 2002 to Raj; Ranga; et al. for Apparatus and Methods for Distributing and Displaying Emergency Communications teaches methods and systems for event management, allowing authorized users or authorities to distribute and display emergency communications on digital displays. In one aspect, an emergency management communications system receives event data sent by an emergency detections system comprised of a network of sensors. The emergency management communications system processes the event data to determine an event perimeter, and then selects one or more digital displays based upon the event data or the determined event perimeter. Next, the emergency management communications system authors one or more emergency communications corresponding to the one or more digital displays and sends said one or more emergency communications to said one or more digital display, thereby allowing the one or more digital displays to display the corresponding one or more emergency communications to the affected populations.

SUMMARY OF THE INVENTION

The present invention is directed to a wireless surveillance system and methods of operating same, providing simple setup and controls for high quality input capture by surveillance input capture devices (ICD) and sharing of same input capture. More particularly, the present invention is directed toward a system and method for easily and securely sharing input capture between the corresponding network recorder and remote viewers through a central cloud server.

Accordingly, one aspect of the present invention is to provide a method for sharing video surveillance data includes the steps of: providing a system for video surveillance; recording and archiving videos from ICDs onto the network video recorder; the system providing access for at least one sharing user logging into network video recorders and selecting at least one video clip or portion of a video clip to be shared; the system providing an interactive user interface for allowing the sharing user to select the SHARE button; the system prompting the sharing user to select at least one other user they want to share the clip with; the system providing the interactive interface for allowing the at least one sharing user to select the SHARE NOW to have the at least one video clip uploaded to the central cloud server; the central cloud server validating that the at least one video clip was completely uploaded without error and the file is not corrupt and it is ready to play; the central cloud server validating that the video clip is authentic from the server it came from; the central cloud server preparing the video clip for sharing by automatically making multiple copies in different formats for playback; the central cloud server notifying the designated receiving users or groups of users that they have shared video from the sharing user and providing a link to the video for viewing the video clip; the receiving user clicking on the link and be taken to a page on the central cloud server that prompts them for a username; providing the receiving user an area for commenting on the video clip; the central cloud server saving the comments; thereby providing a secure method for sharing video clips.

Another aspect of the present invention is a surveillance system for sharing video surveillance data according the present invention includes: at least one input capture device (ICDs), at least one network video recorder, a central cloud server, at least one sharing user device, and at least one receiving user device; all constructed and configured in electronic connection through a network; wherein the ICDs are operable for capturing video and for wireless communication with the network; the network video recorder is operable for recording videos captured by the ICDs; the at least one sharing user device is operable for instructing the network video recorder to upload a video clip from the recorded videos to the central cloud server for sharing; and the central cloud server is operable for sharing the uploaded video clip with a receiving user device.

The system is preferably further operable for the method step of automatically uploading and sharing video clips based on automated computer analysis of the captured video. The analysis is preferably based on criteria that are selected from the group consisting of number of people, direction of people, object left behind, specified license plate numbers, colors, behaviors, sex, age, sounds, race, alarms and combinations thereof.

The present invention is further directed to a method for installing and operating the system and various embodiments and combinations thereof with single click-select functionality.

Thus, the present invention provides systems and methods for the secure sharing of wireless surveillance video, in particular with remote access and controls of the system components.

These and other aspects of the present invention will become apparent to those skilled in the art after a reading of the following description of the preferred embodiment when considered with the drawings.

BRIEF DESCRIPTION OF THE DRAWINGS

FIGS. 4A and 3B are back views of the embodiments shown in Figures 1A and 1B, respectively.

FIGS. 5A and 3B are top views of the embodiments shown in Figures 1A and 1B, respectively.

DETAILED DESCRIPTION OF THE PREFERRED EMBODIMENTS

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Figures 1A, 1B:
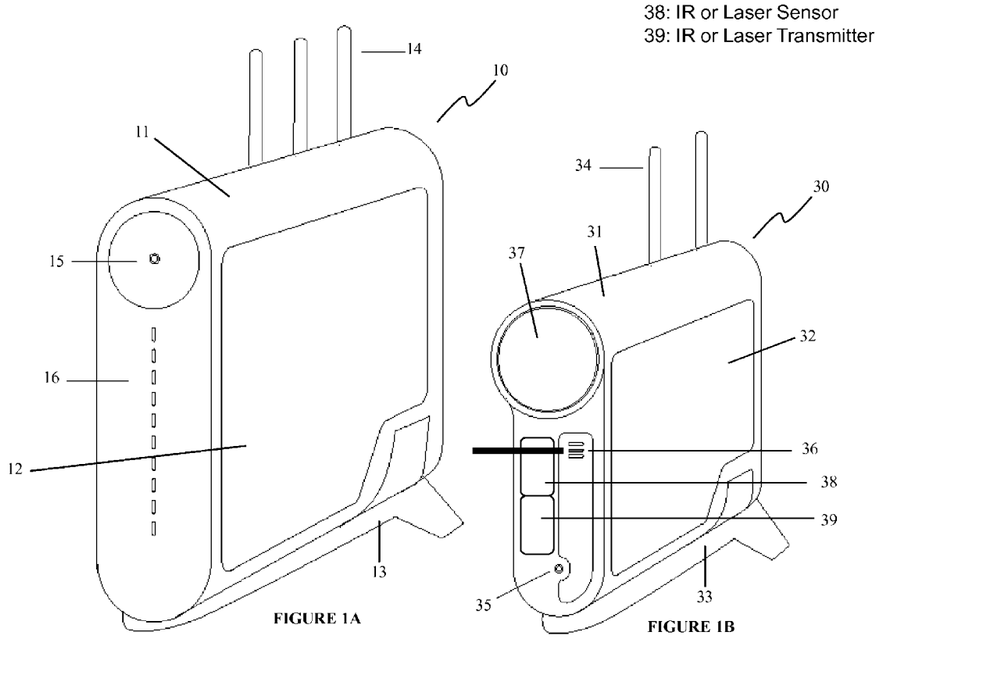
Figure 1A is a perspective view of one embodiment constructed according to the present invention, showing an input capture device and a digital input recorder juxtaposed.
FIG. 1B is a perspective view of one embodiment constructed according to the present invention, showing an input capture device and a digital input recorder juxtaposed.

Referring now to the drawings in general, the illustrations are for the purpose of describing a preferred embodiment of the invention and are not intended to limit the invention thereto. As best seen in FIG. 1, the two base elements of a system constructed according to the present invention are shown side-by-side, including a wireless input capture device and a corresponding digital input recorder.

FIG. 1 shows a perspective view of one embodiment constructed according to the present invention, showing an input capture device ("ICD"), generally referred to as 30, and a digital input recorder ("DIR"), generally referred to as 10, juxtaposed. The DIR 10 has a plastic case 11 with a metal plate 12 affixed thereto and a removable tilt adjustable base 13 removably attached to the bottom of the DIR. Antennas 14, near the top of the DIR provide wireless communication for the present invention. A green power led and button 15 is near the top of the DIR. The button 15 can turn on the motion detection and/or record all functions of the present invention. The status indicator LEDS 26 are placed on the front of the DIR and can illuminate either red or green.

Similarly, the ICD 30 has a plastic case 31 with a metal plate 32 affixed thereto and a removable tilt adjustable base 33 removably attached to the bottom of the ICD. Antennas 34, near the top of the ICD provide wireless communication for the present invention. A power/motion detection LED 35 is positioned near the bottom of the front of the ICD and can illuminate either red or green. A microphone 36 is also positioned on the front of the ICD to detect sound. The camera lens 37 is positioned near the top front of the ICD.

Figure 2A:
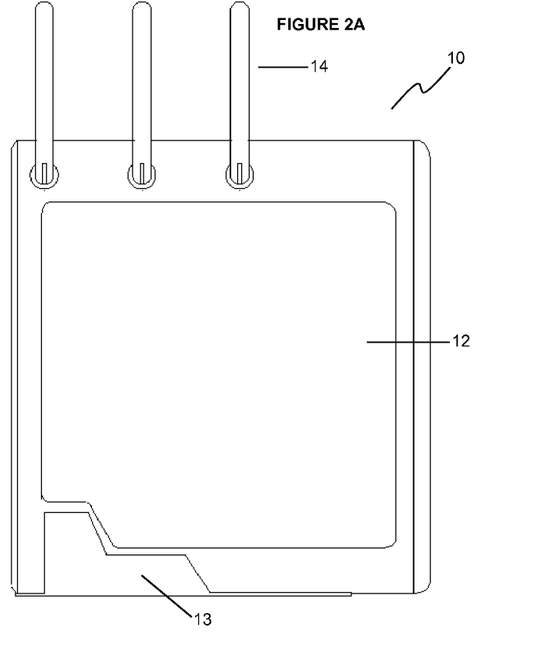
FIGS. 2A and 2B are side views of the embodiments shown in Figures 1A and 1B, respectively.
Figure 2B:
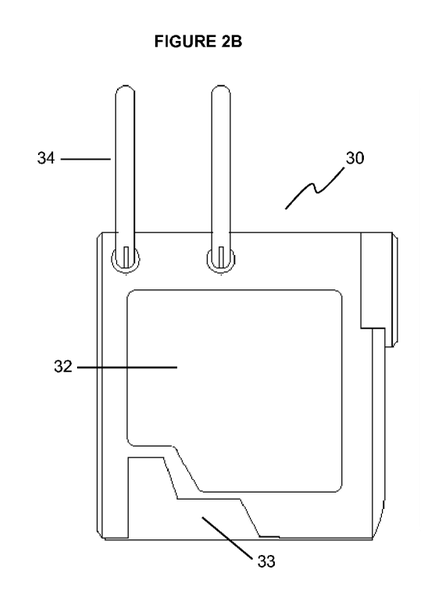

FIG. 2 shows a side view of the embodiment shown in FIG. 1, showing an ICD 30 and a DIR 10 juxtaposed.

Figure 3A:
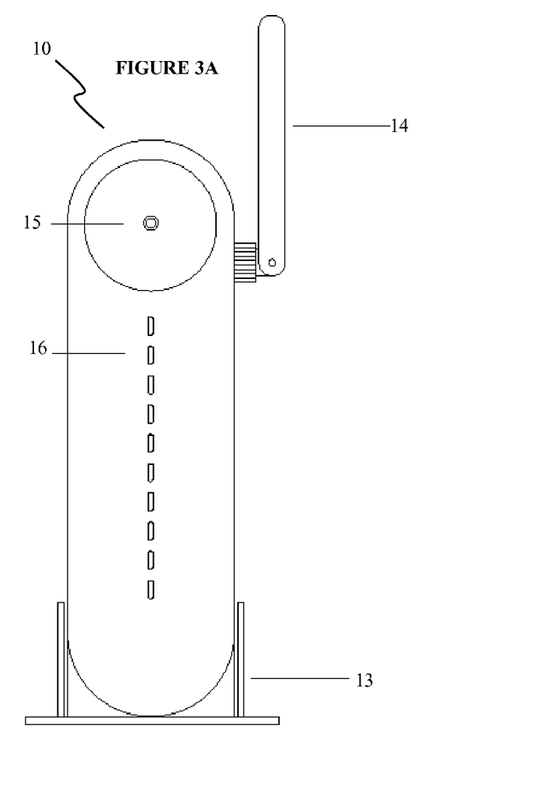
FIGS. 3A and 3B are front views of the embodiments shown in Figures 1A and 1B, respectively.
Figure 3B:
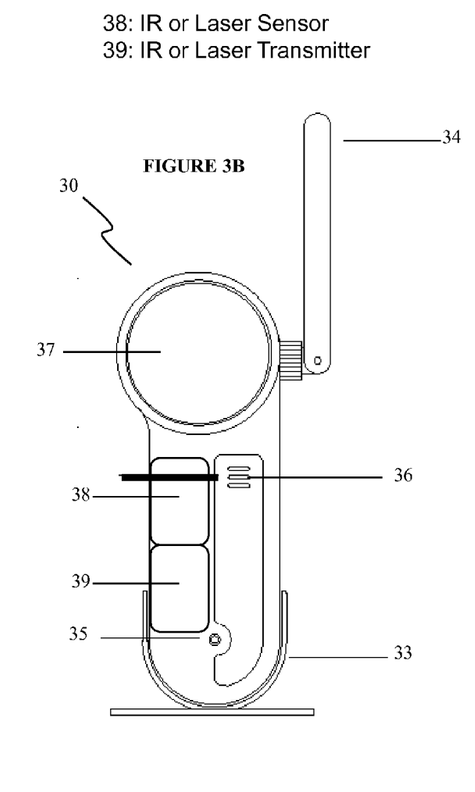

FIG. 3 shows a front view of the embodiment shown in FIG. 1, showing an ICD 30 and a DIR 10 juxtaposed.

Figure 4A:
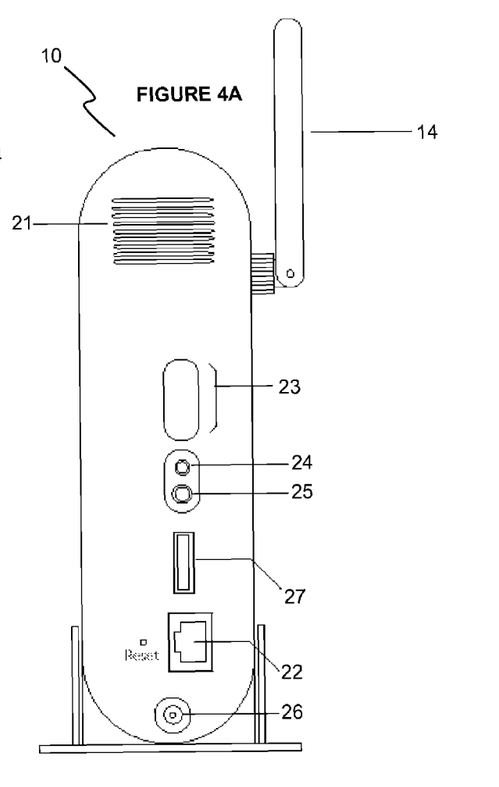
Figure 4B:
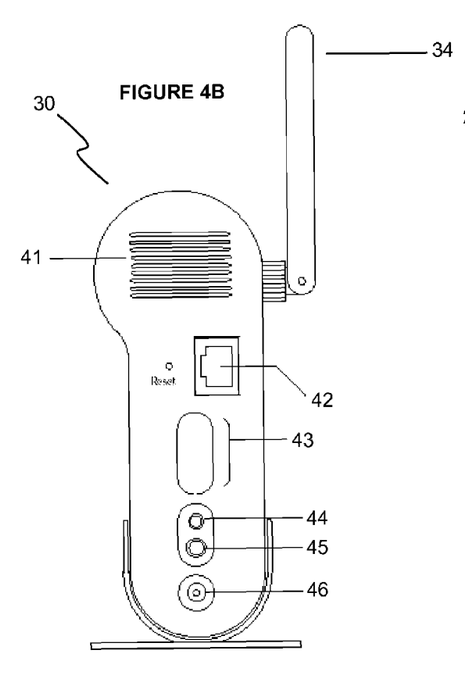

FIG. 4 shows a back view of the embodiment shown in FIG. 1, showing an ICD 30 and a DIR 10 juxtaposed. The ICD 30 has air vents 41 to facilitate cooling of the device. FIG. 4 also illustrates the various ports that are available on the two devices. The ICD 30 has the following ports: RJ-45 42; Alarm I/O Out 43; Microphone In 44; RCA Video Out 45; and DC In 46.

Similarly, the DIR 10 has air vents 21 to facilitate cooling. Some of the ports may differ between the ICD and DIR. The DIR 10 has the following ports: RJ-45 22; Alarm I/O Out 23; Audio Out 24; RCA Video Out 25; DC In 26; and USB 27.

Figure 5A:
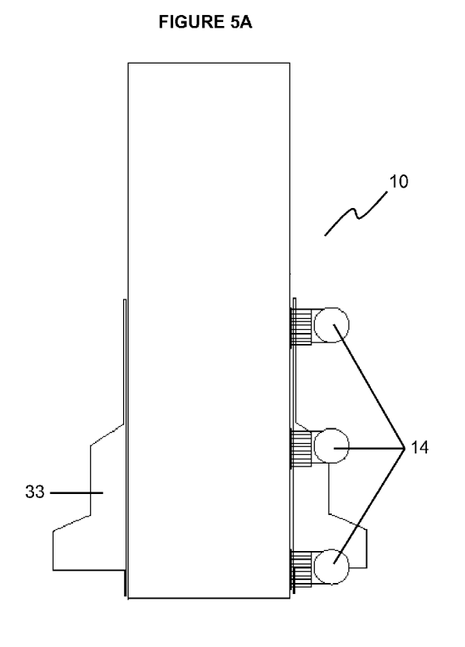
Figure 5B:
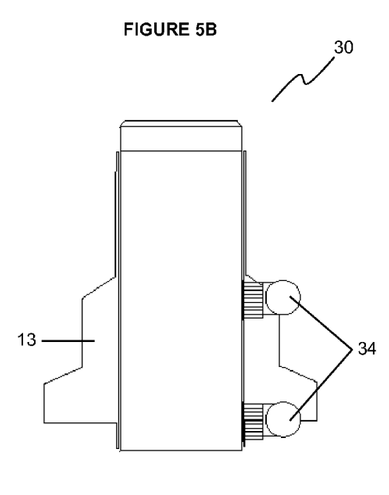

FIG. 5 shows a top view of the embodiment shown in FIG. 1, showing an ICD 30 and a DIR 10 juxtaposed. This demonstrates the possible footprints of the devices.

Figure 6A:
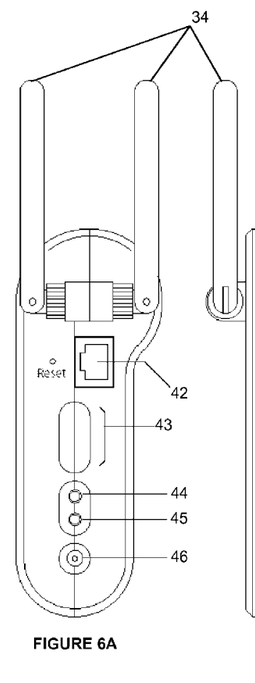
FIGS. 6A, B and C shows a back, side, and front view of an alternative embodiment of the input capture device component of FIG. 1B.
Figure 6B:
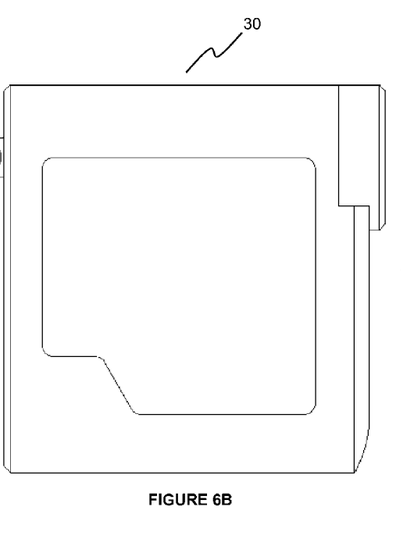
Figure 6C:
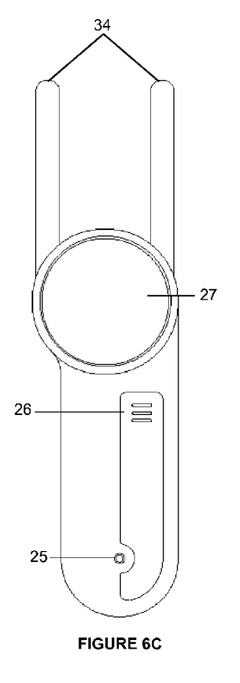

FIG. 6 shows a back, side, and front view of an alternative embodiment of the ICD 30 component of FIG. 1. The ICD 30 is similar to that previously described except the air vents 41 have been removed and the antennas 34 have been positioned to the back of the ICD. Additionally, FIG. 6 illustrates the ICD with the removable tilt adjustable base 33 removed.

FIG. 7 shows a schematic showing the interconnection of remote units of the system.

FIG. 8 shows a user interface view of inputs to the system viewable by a user.

The wireless surveillance system according to the present invention includes at least one wireless input capture device (ICD) for sensing, capturing and transmitting surveillance inputs from a predetermined input capture location, and a digital input recorder device (DIR) for receiving the surveillance inputs from the at least one wireless ICD and storing those inputs, which are capable of being reviewed by a system user on a controller/server computer, wherein the server computer is optionally used for communication with the ICDs and DIRs. In one embodiment of the present invention, the at least one ICD and corresponding DIR device are used to form the system without requiring a separate server computer. The DIR itself has full capabilities when arranged for communication wirelessly with ICDs for recording and controlling inputs to the system, as well as settings for each of the at least one ICD, including activation of each.

Input Capture Device(s) (ICDs)

On the front end of the system, the at least one wireless ICD further includes a power source, a power converter; soft power down component which provides for a gentle power down so that ICD settings are preserved and not lost. Preferably, while the ICD is wireless, it further includes an optional network connection at a back side of the ICD also, so it can be hardwired into a network.

The ICD also includes at least one sensor and at least one input component for detecting and recording inputs, a processor, a memory, a transmitter/receiver, and optionally, at least indicator light for indicating camera activities, all constructed and configured in electronic connection. By way of example and not limitation, the at least one input component may include a microphone, and/or a camera. In one preferred embodiment of the present invention, the at least one wireless ICD includes two antennas for providing a wireless signal for receiving and/or transmitting data with the DIR device or another ICD(s). The ICDs are operable for cross-communication with each other, including data exchange, wherein the data exchange includes information about the surveillance environment, settings, inputs, and combinations thereof. The at least one wireless ICD further includes a housing having a removable casing around the lens to make lens adjustments or settings; ICD adjustments and settings are preferably optional, and are not usually required in preferred embodiments of the present invention, as the DIR device automatically establishes and controls the ICD settings and activities for each of the at least one wireless ICDs associated with the particular DIR device.

For the preferred embodiments where the ICD includes a digital video camera (DVC) having a lens and corresponding camera components, the camera further includes a computer chip providing for capabilities of performing video compression within the ICD itself. The ICD as a wireless digital video camera is capable of capturing video within its range within the surveillance environment and compressing the captured video into a data stream, the capture occurring at predetermined dates and times, during activity detection, and/or on command from the wireless DIR associated therewith. In the case of video, the images are adjustable to capture at different sizes, different frame rates, and/or to include the display of the name of the device (determined by the user and/or the system), the date, the time, and combinations thereof. The ICD including a DVC is capable of capturing images that are combinable and/or integratable with the video data stream and/or compressible into an individual image data stream, all at predetermined dates and times, when activity such as motion or audio are detected, on command from the wireless DVR, and combinations thereof. As with video capture, image capture is adjustable to capture at different sizes, different frame rates, and/or to include the display of the name of the device (determined by the user and/or the system), the date, the time, and combinations thereof. A data stream of images is transmittable wirelessly to the wireless DVR.

Similarly, where the at least one ICD has audio capabilities, the captured audio, which is combinable and/or integratable with other inputs captured by the ICD sensors, is compressible into an individual audio data stream, which is transmittable wirelessly to the DIR. The activity of audio ICD is activatable at predetermined dates and times, during activity detection, and/or on command from the wireless DIR associated therewith. The audio ICD is further adjustable to capture audio at different or variable rates.

Preferably, since the ICD generates heat during operation, the ICD housing includes a cooling system having a vent and a low noise cooling fan. Since the video components of ICDs generate heat that must be dissipated for optimal performance of the system, preferred embodiments of the present invention include housing units with components that operate at lower temperatures, i.e., which generate less heat during operation, and include housing units formed of materials that dissipate heat well, and may include a combination of materials, such as metals and synthetic plastics or composites. While ICDs are preferably used for indoor applications, waterproofing and weather proofing housing units and other components for sealing the housing against water and weather are used for outdoor applications of the present invention. By way of example, sealed or gasketed casing, weatherproof venting and fan components to prevent water blowing into or being sucked into the case, are used for outdoor ICD units.

Other components optional to the housing unit but preferred for ease of use of the system include a removable filter collar on a front end of the camera lens, which facilitates user access for changing the filter and/or to provide a different filter, such as a polarization filter or a specialty filter, for example, to reduce light input or camera aperture.

The ICDs of the present invention are capable of detecting motion, capturing video, detecting and/or capturing audio, providing at least one data stream capability, including video, compressed video, audio, and combinations thereof. The at least one ICD is capable of capturing video, which is compressible into a data stream, and transmittable wirelessly to the DIR device, with the ICD audio data or other input data, such as temperature, humidity, chemical presence, radiation, and other input data, depending upon the sensors and intake means of each ICD, being combinable and/or integratable with the video data stream. Thus, while the ICDs each include at least one sensor for detection and at least one capture input means, preferably each of the ICDs include at least two sensors and input means for image and/or video and audio capture. In a preferred embodiment, at least two sensor types are used, audio and image or video sensors. The at least one indicator is included with the ICD to indicate that the power is "on", and to indicate that motion and/or audio being detected. The indicator is activatable when motion and/or audio is detected in a predetermined area and/or in a predetermined amount within the environment.

Each of the at least one ICDs is constructed for configuration that is capable of wireless communication (2-way) with the corresponding DIR device and/or any other ICD(s), which when configured provide a system for wireless electronic surveillance of an environment. In a preferred embodiment of the present invention, the ICDs are provided with multiple input multiple output (MIMO) wireless capability. Other wireless communication may be provided instead of MIMO.

Night vision for ICD video input capture may be provided using an infrared (IR) light source, so that the video recorded may be effective in low- to no-light conditions. Image or video input capture may be provided in a range of resolution, in black/white, in color, and sized based upon inputs from the DIR device and/or controller/server computer by an authorized user of the system, and are modifiable after setup of the system by modifying controls remotely, and/or by modifying hardware.

The ICD further includes at least one chip that makes the device an intelligent appliance, permitting functions to be performed by the ICD itself without requiring software installation or the DIR, including but not limited to sensor and input controls, such as camera digital zoom, pan left and right, tilt up and down; image or video brightness, contrast, saturation, resolution, size, motion and audio detection settings, recording settings, communication with other ICDs; and single chip video compression (single DSP). The ICD also includes a sensor with ability for high dynamic range for inputs. Preferred embodiments of a system according to the present invention includes video technology commercially provided by PIXIM, and set forth under U.S. Pat. Nos. 6,791,611; 6,788,237; 6,778,212; 6,765,619; 6,737,626; 6,726,103; 6,693,575; 6,680,748; 6,665,012; 6,552,746; 6,545,258; 6,542,189; 6,518,909; 6,507,083; 6,498,576; 6,498,336; 6,452,152; 6,380,880; and 6,310,571.

The ICD further includes a stand to support the device; the stand may be included with, integral with, or attached to the housing. The stand is constructed and configured to be mountable to a wall, suspend from ceiling, and provide a variety of stable positions for the ICD to capture as much data from a given environment as appropriate, given the space, conditions, and input capture type desired. Importantly, the stand serves as a stable base to tilt the ICD for camera direction up and down, and/or side to side. The stand is movable between positions but retains a fixed position by a predetermined friction to ensure so that the ICD stays in place wherever the positioning was last stopped. The base and stand of the ICD is constructed such that it does not require mounting to a surface to provide stability. The adjustability and mobility of the device are significant features of the present invention to ensure optimal surveillance and easy setup.

Furthermore, the stand is weight balanced for good center of gravity to support the adjustment on the stand for stability on the entire range of motion for the ICD on its stand; since motion of the ICD is adjustable and provides for dynamic range of motion when the ICD is in use, the stand construction enables remote modification of settings without requiring the user of the system to readjust or optimize the ICD positioning in person.

The ICD preferably is constructed and configured for a range of coverage, which can vary depending upon the conditions and limitations of a particular target environment. In a preferred embodiment of the system, the ICD has a range of coverage with a target range of at least up to 250 ft. The ICDs are capable of having a range of up to 300 meters, with an active wireless range from 1-1000 ft linear feet indoors. Advantageously, the ICD can be configured and activated quickly for quick start up of a surveillance system in the target environment. Additionally, the ICDs have the ability to communicate with one another to act as a data repeater and extend the usable wireless range to 3,000 meters and more.

Significantly, no adjustments to camera settings, such as focus and focal length, are required after camera installation; ICD settings are preadjusted and further controllable remotely by the DIR and/or RSC and/or other ICD(s). By contrast, in the prior art, adjustments are usually always required for surveillance cameras following installation. Preprogrammed settings may be provided, with automatic and remote adjustment capabilities. Where the ICD is a video camera, the settings may include focus, resolution, etc.

Each of the at least one ICD is constructed to optimally reduce heat from particular heat-generating components. In a preferred embodiment of the present invention, the ICD includes a plastic case with metal sides to reduce heat while the system is running. Also, a back plate of the ICD or camera is all metal to increase heat dissipation, and to optimize weight and heat management, which important where there is a lot of power involved, as with wireless video input devices. Also, significantly, the ICDs and/or DIR devices are constructed with a separate chamber for imaging components to reduce heat. It is known that heat is not good for imaging sensors or equipment; however, cooling fans can generate noise, which is preferably minimized with security systems and components therein. The camera is configured to communicate with an imaging board with a flexible electronics communication cable, which permits the camera to have a separate chamber for optimized heat reduction. This is a problem specific to wireless cameras that has not been successfully addressed in the prior art.

The ICD also includes at least one and preferably two antennas that are removable, including standard antennae, which may be substituted for a patch antenna and/or a long range antenna.

The inputs captured by ICDs are provided to the DIR for which output for RCA viewing is available, such as connecting a monitor with a user interface for remote viewing of video from video cameras. In this case the setup easier because the remote user can see what the camera views from the monitor, which is removably connectable to the system. The ICD and DIR also have an optional network connection at the back side, so the devices can be hardwired into the network, if appropriate; however, wireless connections are preferred.

Additionally, the ICDs have inputs, such as video and microphone, and at least one indicator light. In the case of a wireless video camera, the housing includes an easily removable casing around the lens to make lens adjustments or settings, which optional, and not usually required.

Additionally, the ICDs have the ability to communicate with one another to exchange data about the environment and all control settings and other settings of any other ICDs.

Digital Input Recorder Device (DIR Device)

The wireless DIR device communicates directly with the at least one ICD, and, in embodiments where the controller/server is included in the system, the DIR device also communicates with the controller server to send data streams to the server and receive data or instruction from the controller/server to control its properties. In the case of a video camera for at least one ICD, the DIR may also be referred to as a digital video recorder device (DVR).

Surprisingly, compared with prior art surveillance systems, the DIR device functions as an appliance, which permits a rapid setup of the system. Significantly, since the DIR device operates as an appliance, there is no software installation involved in the basic system setup. The preferred embodiments of the present invention including at least one ICD and a corresponding DIR device permit for setup and recordation of inputs to the system from the observation or surveillance environment with one click activation by the user/installer, generally in less than ten minutes from start to finish. Such rapid setup, including installation and activation to recording of the system, is not possible with prior art systems, given their complex components, interactivity via transmission lines, and/or software installations, which typically require an expert or trained specialist to ensure proper setup, installation, activation, and testing of the system prior to ongoing operation. By sharp contrast, the preferred embodiments of the present invention provide for one click activation for receiving and recording inputs to the at least one wireless ICD, i.e., for activating the ICD capability to record designated dates and times, when a surveillance event, a motion event or an audio event is detected by at least one of the at least one ICDs in the system, immediately after the rapid setup is complete.

Furthermore, the system provides for rapid settings adjustment, including settings for sensitivity of ICD motion and audio detection; preferably, the settings adjustment is made by the user through the DIR device. The user simply sets a surveillance area for observation and data capture by each ICD of the at least one wireless ICD; for video capture, using an ICD with a digital camera, the camera may be set to focus on a predetermined location within the area, such as a window, a door, and the like. While the settings are practically a function of the ICD itself, the DIR device, which is also wireless, functions to control the settings of each of the corresponding ICDs associated with that DIR device. Other functions performed by the DIR device include, but are not limited to printing, saving or storing recorded inputs from the ICDs, transferring data to a removable storage device, such as a USB storage key device.

Also, a power supply and a soft power down function is provided, similar to the ICD soft power down, to preserve the settings of the DIR device in the event of power termination to the device.

The DIR is capable of running software for managing input from the at least one wireless ICD associated with or corresponding to a particular DIR device after installation. With the software, the DIR is capable of intaking and managing up to 10 data streams simultaneously; allowing the user to control the ICD unit, including allowing the user to zoom, pan, and tilt the camera, as well as managing microphone sensitivity. Sensitivity controls for other ICD input means, such as heat or temperature, chemical substance presence, radiation detection, and the like may be controlled remotely from the wireless DIR device as well. Other DIR device control functions for controlling the ICDs include but are not limited to controlling brightness, contrast, color saturation, where images and video are involved.

Other software-based functions capable of being performed by the DIR include sending text message, sending still image, sending email or other communication to a user on a remote communications device; usually, these functions are programmed to occur upon the occurrence of an event. DIR data recordation and storage overwrite may be based on settings that enable newer data to overwrite older data. Additionally, the DIR may be programmed to include overwrite protection to prevent overwriting of event video, audio, or other input data captured by the ICD and transmitted to the DIR device. Preferably, the DIR includes capabilities of data search and display, data archiving to external device, network, computer, server, and combinations thereof, data printing, data exporting, data deletion, data playback, and combinations thereof. Data playback includes play, fast forward, rewind or reverse, frame by frame step forward or backward, pause, and combinations thereof.

In a preferred embodiment of the present invention, the system includes a DIR device running software that is capable of automatically upgrading its own software, which eliminates user maintenance, upgrading, or other activity to optimize system performance.

The DIR's capabilities of adjusting settings and/or controls for the at least one ICDs includes any functions of the ICDs, including but not limited to zoom pan and tilt, color brightness, contrast, saturation, sharpness, frame rate, video and/or image size, audio rate, wireless control data, encryption and security data, set motion and/or audio detection area and/or levels, set recording, set triggers, record on command, and combinations thereof.

The DIR is preferably capable of connecting directly to a computer or a computer network, more specifically connecting to a personal computer via a USB or similar connection and to a network using a network cable or similar connector, with the DIR interface being accessible after such connection through a user interface or a web browser, respectively; and capable of sending data and/or alert or warning to a cell phone or computer via a signal or message such as by voice or email.

Also, the DIR is capable of performing a backup of the ICD inputs, including video, to a network, a personal computer (PC), computer readable medium (CRM) or other storage device. The DIR may be programmed to lock to predetermined ICDs having cameras, to maintain integrity of camera signal to DIR device.

In a preferred embodiment of the present invention, the user interface of the ICD inputs on the DIR device include at least one visual cue on the video to tell whether video is being recorded, e.g., a red and/or green dot is shown on the image. Also, preferably, the DIR device has a front with indicator lights that match or correspond to these same visual cues. For quality checking purposes, similarities such as these provide ease of use for the system user to confirm system functionality upon inspection.

The DIR device is programmable for wireless communication with input capture device, including both transmitting data, settings, controlling instructions and receiving input captured from the ICD, like images, video, audio, temperature, humidity, chemical presence, radiation, and the like. Thus, the DIR device is capable of receiving wireless data from the wireless input capture device(s), indicating which of the ICDs is active, recording data and storing data, searching through recorded data, transmitting data and instructions to the ICD, adjusting ICD settings and/or controls, communicating with the controller/server computer to send and/or receive data, and other functions, depending upon the specifications of the system setup, the environment under surveillance, and whether or not remote access is used via the controller/server computer and Internet.

The DIR device's data recordation and storage capability permit inputs from a multiplicity of ICDs to be associated with each DIR device to be singularly received, recorded, stored, and researched by a remote user from the ICDs. The user can search historically recorded data by date, time, event type, or any other means of selecting a setting or event corresponding to the each or any of the ICDs and the environment under surveillance by the system. Each of the ICDs is capable of individualized settings control by a single DIR device; a multiplicity of DIR devices may be controlled and managed by the controller/server, either within a given surveillance environment or in different locations.

Other components of the DIR device include, but are not limited to having a base that may be optionally adjustable for optimized mounting on a surface; having a long range MIMO wireless component; having a one-chip video compression component for resizing video data, recompressing it, and streaming it; having a USB port connectable to a computer, or for storage key, or removable hard drive for data storage; having an Ethernet port to connect to a network; having RCA video output like the ICDs; having 2 or 3 USB ports for data output as well as for a USB based security key, having at least one antenna, preferably three antennae, which may be removable and replaceable; having a power control button on the housing; having a recessed reset button in the housing, accessible on the backside of the housing; having a low noise fan; having a hard drive for recording inputs; and/or having at least one, preferably a multiplicity of indicators, preferably light emitting diodes (LEDs), that are viewable by a user on the outside of the housing of the DIR device.

By way of example, in a preferred embodiment of the present invention, the DIR device has ten LEDs on the front of the housing, each of which correspond to an individual ICD. Significantly, these indicators, in particular as LEDs, provide content dense visual information with a quick glance from the user. There are five modes that represent ICD status, illustrated for one embodiment in the following table, Table 1:

| LED INDICATOR | CORRESPONDING STATUS |
| --- | --- |
| Off | ICD off |
| Green | ICD connected to DIR device |
| Flashing Green | DIR recording inputs from the ICD |
| Flashing Red | ICD detecting at least one event |
| Red | Error warning |

The error warning may be due to a variety of conditions, such as, by way of example and not limitation, lost connection between the ICD and DIR device, data loss, throughput reduction, etc. In a preferred embodiment of the present invention, each LED that represents an ICD has a light color and flash as described hereinabove, but also shows a number to indicate which camera has the activity and its corresponding section of the target environment, e.g., camera #1 shows the front entrance doorway view.

The optional remote controller or server computer (RSC) runs software providing for remote access and control, and is separate from the wireless DIR. No software installation is required for a remote personal computer or cell phone to access the video through RSC. Users log in with a username and password from any Internet connected PC, web enabled cell phone, or other Internet enabled or network communicable device, to remotely access or review the wireless input or camera video and/or image(s). The user accesses the system through a user interface operating in connection with a web browser. The RSC communicates directly with the wireless DIR and enables users to remotely configure wireless DIR properties and the ICD properties, and, preferably to perform any of the functions that are directly performable for any DIR or ICD, such functions being set forth in the foregoing. The RSC may provide an electronic commerce function such as providing a user to pay for remote access service. The RSC provides an authorized user remote from the target surveillance environment the option of logging into the system, selecting any ICD for monitoring, e.g., select any camera input from any DIR, print, save, email image from the input, such as a video clip, and zoom, pan and tilt live video through the DIR, similar control and/or access activities, and combinations thereof.

The RSC functions as a remote monitoring station like a personal computer and is capable of providing a user interface that is accessible through a web browser; the RSC is thus any Internet connectable device, including computer, PDA, cell phone, watch, any network accessible device, and the like, which provides access for at least one remote user. The at least one remote user is preferably a predetermined, authorized user.

Users of the system are preferably authorized, whether access is direct or remote. Apart from direct access, authorization may also determine levels of access for each user. While all capabilities of the DIR and ICDs are controllable remotely, either by the DIR itself or by an Internet communicable device in communication with a server computer that communicates with the DIR(s), the number and type of devices may be limited based upon authorization level of a user.

The RSC provides for user remote access to live and/or recorded audio and/or video for any camera on any DVR; furthermore, control functions permit this user(s) to adjust and to make changes to any DVR or ICD settings remotely. Also, off-line archiving is operable via the user selecting to remotely record to the RSC.

DIR and ICD Communication Locking

In one embodiment of the present invention, a method for locking communication between at least one wireless input capture device ICD(s) and a corresponding digital input recorder (DIR) or other ICD(s), either one-way and/or two-way, is provided, including the steps of providing base system; at least one user accessing the DIR via user interface either directly or remotely; the DIR and/or ICD(s) searching for signal from the ICD(s) and establishing communication with them; and locking the ICDs to send wireless data exclusively to that DIR or ICD; and/or the DIR or ICD locking itself for exclusive communication with the locked ICDs, thereby providing a secure surveillance system for a target environment.

DIR Activation and ICD Searching

The ICD is activated when at least one user accesses the DIR software by either launching the software directly or launching the DIR device or by clicking on an activation or start button for triggering activity steps within the software and hardware system to activate communication including data exchange between predetermined DIRs and their corresponding selected ICDs. In a preferred embodiment of the present invention the at least one ICD includes a wireless digital camera and the corresponding DIR is a DVR; however, one of ordinary skill in the art will appreciate that the functionality applies to a range of ICDs and corresponding DIRs, with or without video capabilities in each case. When any of these events occur, the DVR initiates checking for signals from prior configured capture devices. If the DVR starts without any prior configured capture devices, then the DVR automatically begins searching for wireless signals from capture devices. If the DVR starts with prior configured capture devices and the user wants to add additional devices, the user clicks on a search button, and the DVR begins searching for wireless signals from capture devices not already configured and communicating with the DVR.

Communication

In a preferred embodiment of the present invention, the DIR is operable to identify signal(s) from the at least one ICD corresponding thereto, and the DIR automatically establishes communication with the identified capture device and creates a named representation, such as an icon or image with a name that represents the active ICD. Also, the DVR is operable to create a named representation for each of the corresponding ICDs associated with that DVR that are identified but not in active communication with the DVR at that time. The non-communication status of these devices is denoted in the representation, for example by at least one indicator having at least one status, as set forth in the foregoing (see, e.g., Table 1). Then, the wireless digital video camera as ICD is operable to send a still image to the DVR interface for the user to confirm identity of the ICD sending the image. The user may rename the ICD at that time or at a subsequent time. Importantly, no additional user steps are required to establish the monitoring set-up.

Camera Validation/Communication Optimization

The DVR is further operable to validate the device approval status for communication with the specific DVR and optimizes the wireless signal to the DVR to ensure the greatest information throughput.

Camera Locking/Security Establishment

Preferably, security functionality is operable when a DIR automatically locks a specific ICD, such as to permit sending wireless data only to that specific DIR and automatically initiating security on the data stream. The security methods may include cryptographic methods such as digital signing, stream cipher encryption, block cipher encryption, and public key encryption or hardware based encryption in which each device has a hardware device for encryption included. By way of example and not limitation, WAP, 802.11i, AES, SSL, stream cipher, Trojan, DES, any other type of security protocol, and combinations thereof may be used.

DIR Locking

Any of the DIRs operable within the system and having at least one ICD associated therewith are further operable to be locked to prevent setting changes or data manipulation from any device apart from the DIR with which each ICD is locked into communication. In one embodiment of the present invention having video capabilities, the DVR as DIR, upon confirming detection of all the signal(s) from ICD(s) associated therewith, confirms the establishment of communication with each detected ICD, in particular wireless digital video camera, and locks the DVR to only communicate with the found device(s), unless it receives instruction from the user to look for other signal(s). The DVR indicates such a locked status, for example, by displaying a lock indicator on the DVR and/or on the ICD to provide an external visual status indication that the ICD(s) are locked and also sends a lock status signal to an entity outside the present system, such as to the RSC and/or an alarm system or security software. Once searching and locking is complete, the DVR will not accept signals from capture devices that are not locked to the DVR, unless directed to search for capture devices by the user by click-selecting the search button. Alternatively, the system can notify the user of new ICDs that come into communication with the system during operation and/or after initial setup has occurred.

Camera Removal

ICDs may be removed from operation and/or operational communication or interaction with the system. To remove a capture device from the DVR system, the user click-selects from the user interface on an image and/or name that represents the capture device they want removed and then click-selects a single removal button. The DIR then removes that capture device from the system.

DIR Interface and Setup Options

In a preferred embodiment of the present invention, a DIR interface and DIR setup options are provided in a user interface, accessible via the RSC or a remote access device. As shown in FIG. 8, a live video interface is provided as one embodiment of the present invention where the ICD includes video capabilities. As illustrated in FIG. 8, a multiplicity of windows or views corresponding to each ICD is provided for access by a user for monitoring and review of inputs captured. The multiplicity of windows or views provide for approximately the same sized window for each view corresponding to each ICD, and preferably a larger, selected frame or view by a user with a frame indicator to show the corresponding small view ICD, as illustrated in FIG. 8. The live video interface displays a solid red dot on any video stream preview that is being recorded, a flashing red dot on any video stream preview of a camera that has detected motion, and a solid thin flashing red dot on any video stream preview of a camera that has detected motion and is recording the video. The live video interface also displays a solid green box around the preview video of the video that is being displayed in the large live video window.

Preferably, the display properties and/or functions including a multiplicity of windows or views preferably correspond to all the ICDs, as illustrated, and in a preferred embodiment, each interface may include up to 10 ICDs and corresponding views. The view provides an ICD activity indicator, including a first indicator on any ICD inputs such as a video stream preview for that which is being recorded on the DIR. The first indicator is preferably a solid red dot viewable on the image user interface. A second indicator on any ICD inputs such as a video stream preview of an ICD that has detected motion; the second indicator is preferably a flashing red dot viewable on the image user interface. A third indicator provides for a combination of the first and second indicator.

Such embodiments of the present invention are operable with a low bandwidth and/or low processing power required. Also, it is preferred that the system simultaneously encodes a video stream into encoded video and series of snapshots or still images associated with any data inputs, particularly video.

Also, it is preferred that the system further includes single click-select functions for easy and convenient operation by a user, the functions including but not limited to: setting camera settings, such as a predetermined list and corresponding selections of ICD and camera settings, including zoom in for target environment subset areas, wherein the user activates the function by a right click-select to select the live video window to pull up; a single click-select to start recording video being displayed in the live video window; view archived video; select the ICD to search corresponding archive; select date or date range; select time or time range; select trigger event choice; sort images corresponding to ICD inputs; click select to play inputs, such as video; print still images of the video being previewed; save the currently viewed video clip(s) to a USB key or other removable memory; back up the input or video archive; access event calendar; calendar interface; provide and/or change settings for all of the ICDs in one simple interface, settings over time for a single ICD in one interface, displays scheduled recording and motion detection, emergency access; and combinations thereof.

Method steps, in addition to basic system operation and activity method steps, include: click and drag a color bar to the ICD timeline; drag new calendar events right onto the calendar; change the length of the time bar set for each calendar event; connect to the RSC; trigger event via the user interface; set a motion detection zone; set a sensitivity for the zone; and combinations thereof.

Video Sharing

The present invention also provides for the secure sharing of the videos through a cloud-based sharing application.

Captured video from ICDs is recorded and stored at the local network where the ICDs are located or at a central location that can accept video streams from anywhere on the network including from wireless and cellular-based cameras. These local and central network video recorders record and archive video. A sharing user can log into these network video recorders and search the recorded video archive and decide which video clip or portion of a video clip or multiple clips or multiple portions they want to share with other users. The user then selects the SHARE button. The user is prompted with the options to 1) select a group of people they want to share the at least one video clip with—these are pre-made groups or 2) individually enter email addresses of people they want to share the clip with.

A variety of sharing options are preferably available. The user may enter a password to limit access to view the at least one video clip. The user may also enter an option to enable or disable the audio portion of the at least one video clip. The user may select a part of the at least one video clip they want to share, e.g., the top half of the video or the lower right corner only. The user may select to lock viewing from MAC Address to only let viewing from a specific computer or device. The user may set when the viewing expires. The user may allow users to make comments on the shared video clip. The user may have comments emailed to them once they are made. The user may enter their own comments on the at least one video clip.

The user then selects the SHARE NOW function to have the at least one video clip uploaded to a central cloud server. When the upload is completed, the central cloud server preferably validates that the at least one video clip was completely uploaded without error and the file is not corrupt and it is ready to play.

The central cloud server may also validate that the video is authentic from the server it came from using an origination validation routine, for example, a bit checking algorithm. The central network server that originally recorded the video stores a validation code that ensures that the video has not been tampered with. The central cloud server gets this validation code by communicating with the server independently of the video upload to validate that the video was genuine and it had not been tampered with before it was uploaded. The video is uploaded separately from the validation communication in order to check if it is original and not altered.

The central cloud server will then prepare the video for sharing by automatically making multiple copies in different formats for playback such as High Resolution, Medium Resolution, Low Resolution, iPhone, iPad, Xoom, Playbook, Tablet, Cell Phone, High Bandwidth, Low Bandwidth.

Once the video is ready to be shared, the central cloud server sends an email or message to all of the designated receiving users or groups of receiving users telling them that they have shared video from the sharing user. They are provided a link to the video and optionally a password for viewing that particular video clip." The receiving user can click on the link in the email or message and be taken to a page on the central cloud server that prompts them for a username, such as their email address and, optionally, a password and they can view the video.

The viewing interface provides for commenting on the video by the receiving user. For example, comments may be made at the bottom of the video. The comments are saved with the video. Users may also comment on the video itself at certain points in the video with text, arrows, circles, squares and the like. Users can select smaller portions of the video or the entire video to re-share with others. This resharing feature allows the users to "re-share" the video with other users.

The present invention also provides for automatic sharing of video clips. The autosharing feature will automatically upload video clips, portions of video clips, or sections of video clips automatically based on certain analytics data or other metadata and automatically share the clip(s) with preset users or groups of users, based on preferences set by an administrator. The automatic sharing takes into consideration analytics data such as number of people, direction of people, object left behind, specified license plate numbers, colors, behaviors, sex, age, sounds (like gun fire) or race and metadata like a fire alarm or motion detection alarm. For example, when a specific license plate number is analyzed by the camera, the video clip of that car is uploaded to the central cloud server and automatically the police in the tri-county area who are looking for that car receive an email and a text message alert with a link to the shared video. Another example is when a camera notices that people are acting unusual, such as large groups gathering or hands being raised in the air, then that clip is uploaded to the central cloud server and alerts are sent out. Yet another example is one where a fire alarm on the third floor of a building goes off and sends an alert to the central cloud server to request that a video clip be uploaded from all the cameras on the third floor of the building to the central cloud server and then the fire marshal, fire department head, and the building's owner are all alerted with a text message and an email with a link to the video clip that shows them what happened on the third floor of the building when the alarm went off.

Thus, a method for sharing video surveillance data includes the following method steps: providing a system for video surveillance, the system including at least one input capture device (ICDs), at least one network video recorder, a central cloud server, at least one sharing user device, at least one receiving user device; recording and archiving videos from ICDs onto the network video recorder; the system providing access for at least one sharing user logging into network video recorders and selecting at least one video clip or portion of a video clip to be shared; the system providing an interactive user interface for allowing the sharing user to select the SHARE button; the system prompting the sharing user to select at least one other user they want to share the clip with; the system providing the interactive interface for allowing the at least one sharing user to select the SHARE NOW to have the at least one video clip uploaded to the central cloud server; the central cloud server validating that the at least one video clip was completely uploaded without error and the file is not corrupt and it is ready to play; the central cloud server validating that the video clip is authentic from the server it came from; the central cloud server preparing the video clip for sharing by automatically making multiple copies in different formats for playback; the central cloud server notifying the designated receiving users or groups of users that they have shared video from the sharing user and providing a link to the video for viewing the video clip; the receiving user clicking on the link and be taken to a page on the central cloud server that prompts them for a username; providing the receiving user an area for commenting on the video clip; the central cloud server saving the comments; thereby providing a secure method for sharing video clips.

The method can further include the system automatically uploading and sharing video clips based on automated computer analysis of the captured video. The analysis can be based on criteria that are selected from the group consisting of number of people, direction of people, object left behind, specified license plate numbers, colors, behaviors, sex, age, sounds, race, alarms and combinations thereof.

The network video recorder is at a location selected from the group consisting of a local network location, a central network location and combinations thereof.

The video formats are selected from the group consisting of High Resolution, Medium Resolution, Low Resolution, iPhone, iPad, Xoom, Playbook, Tablet, Cell Phone, High Bandwidth, Low Bandwidth and combinations thereof.

The method can further include the options of: providing for the at least one user to enter a password to limit access to view the at least one video clip; providing for the at least one user to enter an option to enable or disable the audio portion of the at least one video clip; providing for the at least one user to select a part of the at least one video clip they want to share (such as the top half of the video or the lower right corner only); providing for the at least one user to select the option to lock viewing from MAC Address to only let viewing from a specific computer or device; providing for the at least one user to set when the viewing expires; providing for the at least one user to set the option to allow users to make comments on the at least one video clip; providing for the at least one user to set the option to have comments emailed to them once they are made; providing for the at least one user to enter their own comments on the at least one video clip; providing for the users to comment on the video itself at certain points in the video with text, arrows, circles, and squares; providing for the merging of comments by users; permitting the resharing of all or part of the at least one video clip by the receiving users.

A surveillance system for sharing video surveillance data according to the present invention, as shown in FIG. 11, thus includes: at least one input capture device (ICDs), at least one network video recorder, a central cloud server, at least one sharing user device, and at least one receiving user device; all constructed and configured in electronic connection through a network; wherein the ICDs are operable for capturing video and for wireless communication with the network; the network video recorder is operable for recording videos captured by the ICDs; the at least one sharing user device is operable for instructing the network video recorder to upload a video clip from the recorded videos to the central cloud server for sharing; and the central cloud server is operable for sharing the uploaded video clip with a receiving user device.

The system is preferably further operable for automatically uploading and sharing video clips based on automated computer analysis of the captured video. The analysis is preferably based on criteria that are selected from the group consisting of number of people, direction of people, object left behind, specified license plate numbers, colors, behaviors, sex, age, sounds, race, alarms and combinations thereof. The receiving user device is also preferably operable for resharing the shared video clip.

Certain modifications and improvements will occur to those skilled in the art upon a reading of the foregoing description. All modifications and improvements have been deleted herein for the sake of conciseness and readability but are properly within the scope of the claims.

What is claimed is:

1. A method for sharing video surveillance data, the method steps comprising:
   a) providing a system for video surveillance, the system including at least one input capture device (ICDs), at least one network video recorder, a central cloud server, at least one sharing user device, at least one receiving user device;
   b) recording and archiving videos from ICDs onto the network video recorder;
   c) the system providing access for at least one sharing user logging into network video recorders and selecting at least one video clip or portion of a video clip to be shared;
   d) the system providing an interactive user interface for allowing the sharing user to select the SHARE button;
   e) the system prompting the sharing user to select at least one other user they want to share the clip with;
   f) the system providing the interactive interface for allowing the at least one sharing user to select the SHARE NOW to have the at least one video clip uploaded to the central cloud server;
   g) the central cloud server validating that the at least one video clip was completely uploaded without error and the file is not corrupt and it is ready to play;
   h) the central cloud server validating that the video clip is authentic from the server it came from;
   i) the central cloud server preparing the video clip for sharing by automatically making multiple copies in different formats for playback;
   j) the central cloud server notifying the designated receiving users or groups of users that they have shared video from the sharing user and providing a link to the video for viewing the video clip;
   k) the receiving user clicking on the link and be taken to a page on the central cloud server that prompts them for a username;

l) providing the receiving user an area for commenting on the video clip;
m) the central cloud server saving the comments;
n) thereby providing a secure method for sharing video clips.

2. The method of claim 1, further including the step of the system automatically uploading and sharing video clips based on automated computer analysis of the captured video.

3. The method of claim 2, wherein the analysis is based on criteria that are selected from the group consisting of number of people, direction of people, object left behind, specified license plate numbers, colors, behaviors, sex, age, sounds, race, alarms and combinations thereof.

4. The method of claim 1, wherein the network video recorder is at a location selected from the group consisting of a local network location, a central network location and combinations thereof.

5. The method of claim 1, wherein the system provides for the at least one user to enter a password to limit access to view the at least one video clip.

6. The method of claim 1, wherein the systems provides for the at least one user to enter an option to enable or disable the audio portion of the at least one video clip.

7. The method of claim 1, wherein the system provides for the at least one user to select a part of the at least one video clip they want to share.

8. The method of claim 1, wherein the system provides for the at least one user to select the option to lock viewing from MAC Address to only let viewing from a specific computer or device.

9. The method of claim 1, wherein the system provides for the at least one user to set when the viewing expires.

10. The method of claim 1, wherein the system provides for the at least one user to set the option to allow users to make comments on the at least one video clip.

11. The method of claim 1, wherein the system provides for the at least one user to set the option to have comments emailed to them once they are made.

12. The method of claim 1, wherein the system provides for the at least one user to enter their own comments on the at least one video clip.

13. The method of claim 1, wherein the different formats for playback are selected from the group consisting of High Resolution, Medium Resolution, Low Resolution, iPhone, iPad, Xoom, Playbook, Tablet, Cell Phone, High Bandwidth, Low Bandwidth and combinations thereof.

14. The method of claim 1, wherein the system provides for the users to comment on the video itself at certain points in the video with text, arrows, circles, and squares.

15. The method of claim 1, further permitting the resharing of all or part of the at least one video clip by the receiving users.

16. A surveillance system for sharing video surveillance data, the system including: at least one input capture device (ICDs), at least one network video recorder, a central cloud server, at least one sharing user device, and at least one receiving user device; all constructed and configured in electronic connection through a network; wherein the ICDs are operable for capturing video and for wireless communication with the network; the network video recorder is operable for recording videos captured by the ICDs; the at least one sharing user device is operable for instructing the network video recorder to upload a video clip from the recorded videos to the central cloud server for sharing; and the central cloud server is operable for sharing the uploaded video clip with a receiving user device.

17. The system of claim 16, wherein the system is operable for automatically uploading and sharing video clips based on automated computer analysis of the captured video.

18. The system of claim 17, wherein the analysis is based on criteria that are selected from the group consisting of number of people, direction of people, object left behind, specified license plate numbers, colors, behaviors, sex, age, sounds, race, alarms and combinations thereof.

19. The system of claim 18, where the receiving user device is operable for resharing the shared video clip.

* * * * *